1,993,966

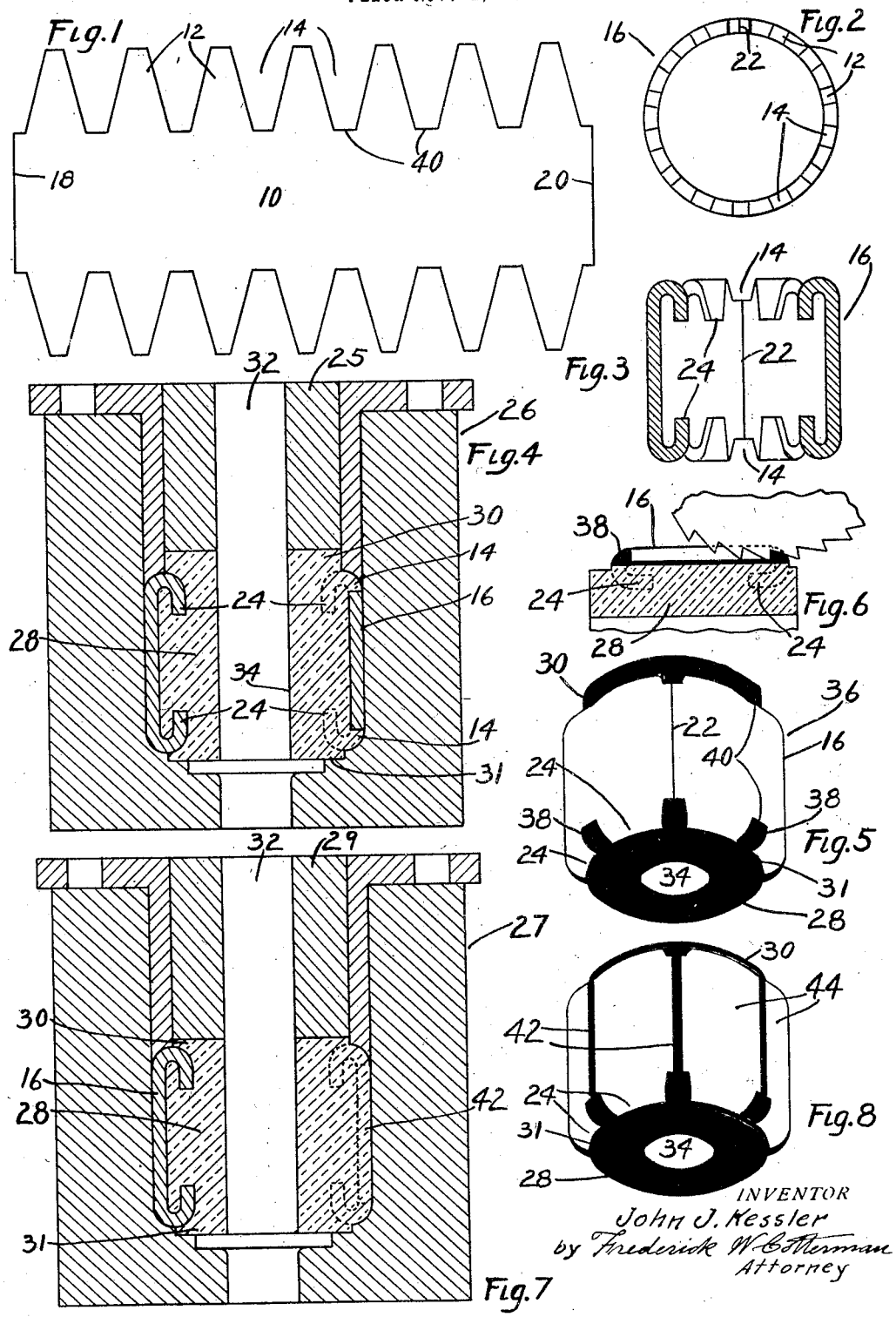
March 12, 1935.    J. J. KESSLER    1,993,966
METHOD OF MAKING COMMUTATORS
Filed Nov. 1, 1933
INVENTOR
John J. Kessler
by Frederick W. Otterman
Attorney Patented Mar. 12, 1935

UNITED STATES PATENT OFFICE 1,993,966

METHOD OF MAKING COMMUTATORS

John J. Kessler, St. Louis, Mo., assignor to Bessie D. Apple

Application November 1, 1933, Serial No. 696,227

9 Claims. (Cl. 29—155.54)

This invention relates to commutators, and particularly to molded commutators, that is, commutators comprising a plurality of segments of conductive material bound together by a core of insulating material molded in situ between and about them.

For the purpose of the present disclosure commutators of the molded type may be divided into two classes, first, undercut commutators, wherein the core of insulation extends about the ends of the segments, or about anchors depending from the segments, but not between the segments to the outer diameter, and second, flush type commutators, wherein the core of insulation separates the segments by extending between them all of the way out to the outside diameter upon which the brushes bear.

One peculiar fault often objected to in an undercut commutator is that it is noisy at high rotative speed. On the other hand it has the advantage of being more easily made, inasmuch as there is no difficulty in holding the several segments spaced from each other while insulation is being molded into the spaces as there is in a flush type commutator.

It is therefore broadly the object of this invention to first make a molded undercut commutator by any new or known method which is both inexpensive and effective, and then convert it into a flush type commutator, not necessarily by adding new and further insulation to fill the undercuts, as is now done in common practice, but by resoftening the molded core of an undercut commutator, once it is substantially complete as such, and applying pressure to the material of the resoftened core itself to extrude it into the undercuts between the segments.

When however it is deemed essential that the undercuts between the segments be filled with a material which may not readily be made sufficiently plastic to be extruded from the body of the core, such for instance as sheet mica, the core may be molded from a material which will resoften, and strips of sheet mica or similar material may then be inserted in the undercuts and the core resoftened and extruded about the mica strips and into such slight parts of the undercuts as the mica strips may not have completely filled, thereby binding the mica strips tightly in the undercuts.

Any insulating material which may be softened and molded into a commutator core, then hardened, and afterward resoftened and extruded between the segments into the undercuts is suitable, if it will not subsequently resoften or be otherwise rendered unfit by the heat incident to its use as a commutator, but the most widely used insulating materials for making the cores of small molded commutators are of the thermoplastic and thermosetting variety. As generally understood insulating materials belonging to this class soften upon application of a proper degree of heat and shortly thereafter react and permanently harden upon a continuance of the same degree of heat which softened them, after which they may not again be softened.

But what is not so universally understood is that a very low degree of heat for a very long period of time will ordinarily have substantially the same effect to harden these compounds as a very high degree of heat for a very short period of time, that is, the period of time required for the chemical reaction which permanently hardens these materials may be controlled within rather broad limits by suitably controlling the degree of heat applied. Thus it might be said that at three hundred degrees Fahrenheit certain of these materials might react and be completely hardened in twenty minutes so that they might not again be softened while at room temperature or about seventy degrees the process of reaction would be so slow that it might take many days for the same degree of hardness to be reached.

In considering the foregoing characteristics of some of the thermoplastic thermosetting insulating compounds it will be seen that it is practicable, where it is found to be an advantage, to first apply a relatively high degree of heat for a rather short period of time to partially react the material, then arrest the reaction for several days or longer by reducing the heat to room temperature, then completing the reaction and final hardening by again applying a high degree of heat. In this connection it should be pointed out that whenever the chemical reaction is arrested before it is complete by discontinuing the heat which is then being applied, the material retain a certain degree of thermoplasticity, that is, upon a second application of a sufficiently high degree of heat the material will again soften to some extent, the degree of heat required and the degree of softening resulting therefrom depending of course on how nearly completed the chemical reaction was when it was arrested. The manner in which these characteristics, peculiar to materials which are both thermoplastic and thermosetting, are advantageously utilized to attain the object of this invention will hereinafter more clearly appear.

One of the most economical methods known to applicants of producing a small molded commutator of the undercut type is that disclosed in United States Patent No. 1,578,793, issued to Vincent G. Apple, wherein a metal commutator ring is provided by bending a flat sheet in the form of a tube, molding a core of insulation within it, then making a series of longitudinal saw cuts in the outer diameter, such saw cuts being of a depth but slightly greater than the thickness of the wall of the tube.

Since it is the object of this invention to take a substantially completed undercut commutator, and by slight modification of the steps required to produce it, convert it into a flush type commutator, the steps recited in the Apple patent supra will be included in the preferred embodiment of the present invention, the Apple steps being so modified herein as to provide a flush type commutator at an additional labor cost which is practically negligible.

The manner in which this embodiment of the invention is carried into effect will now be specifically described, reference being had to the accompanying drawing, wherein—

Fig. 1 shows the outline of a toothed sheet metal stamping from which the commutator cylinder may preferably be formed.

Fig. 2 shows the stamping Fig. 1 rolled into a cylinder with the teeth at the ends.

Fig. 3 shows how the teeth at the ends of the cylinder are turned inwardly to form anchors to hold the metal to the core when it is afterward separated into segments.

Fig. 4 shows the cylinder Fig. 3 in a mold as it appears after the core of insulation has been molded into the cylinder and about the anchors and ends.

Fig. 5 shows the cylinder and core as it appears when removed from the mold Fig. 4.

Fig. 6 shows how the cylinder Fig. 5 is divided by a saw into segments.

Fig. 7 shows how the divided cylinder Fig. 6 is placed in a second mold for a further molding operation.

Fig. 8 shows the completed commutator having an integral core of insulating material which extends also into the cuts made by the saw as in Fig. 6.

Similar numerals refer to similar parts throughout the several views.

To carry out this embodiment of the invention there should first be provided a hollow one-piece metal cylinder preferably having a number of inwardly extending anchors corresponding to the desired number of segments in the commutator, spaced apart at its inner diameter. Such a cylinder may be variously made, and the manner of making it forms no part of the present invention, the method hereinafter described for making such a cylinder being however much preferred because it is highly effective and of low cost.

The preferred method of making the commutator cylinder consists of providing a sheet metal blank 10 having a series of teeth 12, equally spaced by notches 14 at each edge. This blank is rolled into the form of a cylinder as shown in Fig. 2 having the ends 18 and 20 of the blank brought together and in contact as at 22, the teeth 12 at this stage extending axially from each end of the cylinder.

After the cylinder 16, Fig. 2, has been formed, the teeth 12 are bent inward to form the anchors 24, Fig. 3, which will later be buried in the mass of insulation composing the core.

The cylinder 16 is next placed in the mold 26, Fig. 4 and a core 28 of insulation is compressed within the cylinder and about the anchors 24, the core extending somewhat beyond the anchors at the ends to form the hubs 30 and 31. A center plug 32 of the mold forms an axial opening 34 through the core of an armature shaft. It will be noticed that in Fig. 4 the hub 30 is slightly longer than the hub 31, although in the finished commutator both hubs 30 and 31 may be of the same length. With the cylinder 16 placed in the mold 26 as shown, together with the proper volume of the unmolded insulation, heat and pressure are applied to the mold and its contents, and, if a thermoplastic thermosetting insulating material is being used, it is highly essential to the success of the invention that the heat which is applied at this time should not be continued for the full period of time required to completely react the insulation, but should be interrupted before complete reaction has quite taken place. Preferably the degree of heat applied should be somewhat less than that employed when it is desired to bring about the reaction in the shortest possible time.

Fig. 5 shows the partly completed commutator 36 after removal from the mold 26, Fig. 4, the core 28 completely filling the inside of the cylinder, and having integral portions 38 extending into the spaces between the anchors 24. When the core 28 is completely cooled it will be substantially as hard as it can be made, but it will be only this hard as long as it is cool, inasmuch as the application of heat was interrupted before complete reaction of the insulation had been effected. In other words the core 28 still retains, to some degree, its thermoplastic properties, and therefore with sufficient heat may again be somewhat softened. It is however preferable that reaction at this time be so nearly complete that subsequent heating will bring about a state of limited plasticity rather than a high degree of fluidity.

The cylinder 16, Fig. 5, is now sawed into segments. It will be observed that the joint 22 comes midway between two of the anchors 24 so that if the first saw cut is made through this joint, and the remaining cuts equally spaced, each segment so made will have a pair of anchors 24 holding it to the core 28. The flat bottoms 40 of the notches 14 in the blank 10 may preferably be several times the width of the saw cut which will separate the commutator into segments in order that extreme accuracy in the making of the commutator cylinder may not be required.

Fig. 6 shows a partially completed commutator in which one of the saw cuts which separate the ring 16 into segments has been made. These cuts are of sufficient depth to completely sever the cylinder 16, and extend very slightly into the core 28, beginning and ending in the portions of the insulation 38 which filled the notches 14, but they are preferably not deep enough to extend materially into the main body of the core 28 within which the prongs 24 of the commutator cylinder are imbedded.

When the cylinder 16 has been separated into the required number of segments, by saw cuts such as are shown in Fig. 6, there will have been produced an undercut commutator which is substantially complete as such. But inasmuch as the object of this invention is to make a flush type commutator, a further step is required to effectuate this object. This further step in the present embodiment comprises taking advantage of the limited residual thermoplasticity of the core 28 by again applying heat thereto to again make it slightly but sufficiently plastic to extrude a small portion thereof radially outward to completely fill the saw cuts between the segments. To this end the undercut commutator is placed in a second mold 27 which is identical with the mold 26 except that the plunger 25 which was employed in mold 26 has been replaced by a slightly longer plunger 29.

When the undercut commutator is first placed in the second mold 27 the hub 30 of the core 28 is somewhat longer than the hub 31 and it is this extra length which provides the additional volume for filling the saw cuts of the commutator. After the undercut commutator is placed in the mold 27 a relatively high degree of heat and a relatively high pressure are applied to the mold and its contents, preferably both heat and pressure are higher than was previously applied to the mold 26. When this high heat and high pressure have been continued for a sufficient time the core 28 becomes again slightly plastic and the hub 30 is reduced in length, whereupon a corresponding volume of the now slightly plastic insulation is extruded radially outward between the segments to the brush track. The heat is then continued until complete reaction of the insulation composing the core is effected, after which no amount of heat will again materially soften the core.

Fig. 8 shows a completed commutator after removal from the second mold 27. It will be seen that the insulation core 28 extends, not only within the cylindrical row of segments 44, and about their inturned anchors 24, but also outwardly between the segments as at 42 flush with the outside diameter of the commutator.

In describing the procedure followed in producing the foregoing embodiment of the invention no particular kind of thermoplastic thermosetting insulating compound is indicated as being the most desirable for the purpose therein required, and, inasmuch as numerous compounds of this class are now commercially available, some suggestion as to a suitable material and its time-temperature operating characteristics may be broadly suggested although it is to be understood that the invention is being claimed irrespective of the particular kind of thermoplastic thermosetting insulation used, and in fact independently of whether the compound is both thermoplastic and thermosetting, or is only thermoplastic, it being however understood that where the insulation employed is only thermoplastic and not thermosetting it must have a fusion point well above the operating temperature of the machine in which the commutator is to be used.

But where an insulating material is employed which is both thermoplastic and thermosetting, as suggested in the preferred embodiment herein disclosed, a suitable compound may comprise a filler of powdered mica or powdered asbestos or a mixture of both, with a binder of a phenol aldehyde type of resin or a glycerine phthalic anhydride type of resin. With compounds of this kind the first molding operation has been satisfactorily carried out, when the mass was small, at a temperature of about two hundred degrees Fahrenheit applied over a period of fifteen minutes, while the final molding operation was carried out at a temperature of about three hundred and sixty degrees Fahrenheit applied over a period of twenty minutes.

It will however be understood that the periods of time and degrees of temperature most suitable for the several operations will vary with the size of the mass and the composition of the molding compound used.

While the invention herein disclosed may find its widest application in the illustrative embodiment described and illustrated in the drawing, wherein a thermoplastic thermosetting core is molded in a solid ring and partly cured, the ring sawed, and the core resoftened and extruded into the saw cuts then completely hardened, it may also find application where a molded undercut commutator is first otherwise made and the core then extruded into the undercuts.

Again the invention may find application in its broader aspects where the core is of an insulating material of high softening temperature but which is not thermosetting, or it may find application where the undercuts are first filled with non-plastic strips and the previously molded and resoftenable core extruded about the strips.

Holding this view of the scope of the invention, I claim,

1. The method of converting an undercut commutator, in which a series of metal segments are secured in cylindrical formation around a core of hardened thermoplastic insulation so that they are separated at the periphery of the cylinder by air spaces only, into a flush type commutator, which consists in confining the undercut commutator in a mold, applying heat and pressure to said hardened core, and maintaining said heat and pressure until the core softens sufficiently to be extruded by said pressure into said air spaces.

2. The method of making a commutator which consists in providing a metal cylinder with a core of molding compound, which core has not been made completely non-plastic by the molding process, then sawing longitudinal slots in the metal comprising this cylinder, and finally molding the structure a second time to extrude the molding compound between the sawed slots.

3. The method of making a flush type commutator, which consists of molding a core of thermoplastic insulation into a hollow metal cylinder, hardening said core, dividing said cylinder into segments by a stries of longitudinal saw cuts, confining the sawed structure in a mold, applying heat and pressure to said core, and maintaining said heat and pressure until said core again softens and is extruded by said pressure into the said saw cuts.

4. The method of making a flush type commutator, which consists of providing a hollow metal cylinder having a series of inwardly extending anchors, molding a core of thermoplastic insulation into said cylinder and about said anchors, hardening said core, dividing said cylinder into segments by making a series of longitudinal cuts through the wall of said cylinder between said anchors, confining the sawed structure in a mold, heating said core until it becomes somewhat plastic, and extruding a portion of said core by pressure into the said longitudinal cuts.

5. The method of making a commutator, which consists in providing a metal cylinder having separated tongues at each end, one for each commutator bar, turning the tongues inwardly from the body part of the cylinder toward the axis thereof to provide a holding means, placing a moldable adhesive material between the tongues, dividing the cylinder into a plurality of commutator bars, and finally molding the divided cylinder a second time to extrude the molding compound between the bars.

6. The method of making a flush type commutator which consists of first providing an undercut commutator in which a molded and hardened core of thermoplastic thermosetting insulation, the thermosetting of which has been arrested before it was complete, holds a series of metal segments around the periphery having air spaces therebetween, placing the said undercut commutator in a mold, applying heat and pressure to said core, and maintaining said heat and pressure until part of said core material softens, extrudes into said air spaces and is rendered non-plastic by completion of the thermosetting action of the material.

7. The method of making a commutator, which consists of compressing a core of thermoplastic thermosetting insulation into a hollow metal cylinder, heating said core to effect thermosetting of the material, discontinuing said heat while the core still retains some of its thermoplastic property, cooling the core to harden it, separating the cylinder into segments by a series of longitudinal cuts, confining the structure in a mold, applying heat to the core to effectuate its remaining thermoplasticity, extruding a portion of said core into said longitudinal cuts then maintaining said heat until complete thermosetting of the core has been effected.

8. The process of making a commutator which consists of providing a metal cylinder with a core of molding compound, which has not been made completely non-plastic by the molding process, then sawing longitudinal slots in the metal comprising the cylinder, inserting strips of sheet insulating material in these slots and finally molding the structure a second time to extrude the molding compound around the sheet insulating material.

9. The process of making a commutator which consists in providing a metal cylinder with a core of molding compound, which has not been made completely non-plastic by the molding process, then sawing longitudinal slots in the metal comprising the cylinder, inserting strips of mica in these slots and finally molding the structure a second time to extrude the molding compound around the mica.

JOHN J. KESSLER.